Dec. 15, 1931.  F. SOMMER  1,837,079
PROCESS FOR OBTAINING AMMONIA AS AMMONIUM SULPHATE FROM GASES

Filed Dec. 4, 1930

Inventor:
Friedrich Sommer
by
J. C. Hutchinson Jr.
Attorney

Patented Dec. 15, 1931

1,837,079

UNITED STATES PATENT OFFICE

FRIEDRICH SOMMER, OF RECKLINGHAUSEN, GERMANY, ASSIGNOR TO FIRM CARL STILL, OF RECKLINGHAUSEN, GERMANY

PROCESS FOR OBTAINING AMMONIA AS AMMONIUM SULPHATE FROM GASES

Application filed December 4, 1930, Serial No. 500,052, and in Germany December 9, 1929.

The invention consists in improvements and developments of the process of obtaining ammonia as ammonium sulphate from gases which are free, or are freed, from sulphuretted hydrogen, in which process the gases are washed by a sulphurous acid ammonium sulphate lye which is then oxidized. The invention also comprises the utilizing of the original content of sulphuretted hydrogen of the gases as a source for the sulphuric acid necessary in the process.

The accompanying drawing shows diagrammatically, mainly in vertical section, as an example one embodiment of a plant for carrying out the process according to the invention.

It is assumed that the gases to be treated are obtained from dry distillation or gasification of solid fuel such as coal, viz., coke oven gas, lighting gas, carbonization gas, producer gas and the like. Such gases contain in the crude condition more or less ammonia, hydrogen sulphide and cyanogen as constituents to be removed and recovered in the process.

The crude gases coming from the distillation furnaces or gas producers enter through a pipe 1 one or more tubular cooling devices 2 in order to be cooled therein to the ordinary temperature. Tar and ammonia liquor are separated out on cooling and are lead away by a delivery pipe 3 to a decanting container 4. The tar separated out therein enters into a container 5, the ammonia liquor into a container 6. The gases cooled in the cooler 2 are led through an exhauster 7 into a pipe 8.

The ammonia liquor is led from the container 6 by a pump 9 and pipe 10 to a distilling apparatus 11 and the vapours distilled from the liquor are admixed, by means of the pipe 12, to the gases from the cooler 2 flowing through the pipe 8. The gases are moderately warmed, which aids their further treatment, by the compression of the gases in the exhauster 7 and by mixing with the hot vapours of distillation from the pipe 12. The gases now pass from the pipe 8 into the scrubbing tower 13 provided with lattice-work or the like where they are washed by an aqueous suspension of iron oxides and hydroxides distributed from above by a spraying device 14, in order to be freed from their content in hydrogen sulphide. By this washing the temperature of the gases and of the washing liquid is maintained at from 30–40° C. As the gases entering the tower 13 are combined with the vapours distilled from the raw ammonia liquor, which separates out from the gases cooled in the cooler 2, the effect is obtained that these mixed gases have the whole of their content of hydrogen sulphide originally present in their crude state. The washed gases pass from the upper part of the tower 13 through a pipe 53 and are led thence for the further treatment described later.

The washing liquid collected in the bottom portion of the tower 13 is forced through a pipe 15 and a rotary pump 16 into the bottom of an oxidizing tower 17 in which a high column of liquid is held. Compressed air is led into the bottom of this column through a distributing apparatus 18, the compressed air being either taken from a supply of fresh compressed air or, as is assumed in the present example, from the waste air from a later stage of the process. The air rising through the liquid column in the tower 17 oxidizes the iron sulphide formed by the washing in tower 13 to sulphur and revivifies at the same time the suspension of iron compounds. The crude sulphur forms a frothy mass floating on the surface of the column of liquid and, after collecting in this state at the upper end of the tower 17, passes through pipe 19 into a separating vessel 20 provided on the top of the tower 13. The particles of the liquid, passing downwards in the vessel 20 and taking with them the iron compounds, are returned by a dip pipe 21 and a pipe 22 to the sprinkling apparatus 14 to be distributed again over the lattice-work to the tower 13. The sulphur foam on the surface of the liquid in vessel 20, taking with it some of the liquid, passes through a pipe 23 into a container 24 wherein there is a further deposition of sulphur, and from which the waste air for oxidation, which is slightly ammoniacal, is discharged to a final washer (not shown). The liquid discharged from the bottom of the container 24 is led away through a pipe 25.

The wet sulphur foam deposited in the container 24 is led through a pipe 26 to a rotary cellular filter drum 27 in which a suction effect is produced by utilizing partial vacuum. The dry crude sulphur deposited on the periphery of the filter drum is removed by a scraper 28 and is led to a worm conveyer 29 which, by the provision of a steam heating arrangement, at the same time dries the moist mass. The filtered liquid is received in a pair of closed containers 31, each of the containers, which is alternately connected to the vacuum pump and to the atmosphere, receiving the contents from the pipe 30 and discharging it through a pipe 32. The pipes 25 and 32 are connected together to a pipe 33 which opens into the lower part of the tower 13 and thereby returns the liquid separated from the raw sulphur into the cyclic path of the washing liquid.

By washing the gas in the tower 13 by means of an aqueous suspension of iron compounds not only a portion of the ammonia which remains continually in the circulating liquid, but also the sulphuretted hydrogen as well as the hydrocyanic acid are taken up from the raw gases by the liquid itself or by the iron compounds floating therein. At the end of the process of oxidation in the tower 17, this cyanogen generally appears in the form of Prussian blue which passes into the sulphur foam. Consequently, the raw sulphur obtained contains, besides the actual elemental sulphur and iron hydroxide mixed with them, also practically the whole of the cyanogen of the raw gases in the form of Prussian blue.

This raw sulphur serves as the starting material for the further treatment of the gases in order not only to fix and recover their ammonia but also to make available, from the Prussian blue obtained as aforesaid, a further amount of ammonia. The crude sulphur taken up by the conveyer 29 is led through the pipe 73 into a roasting furnace 34 which is shown in the example illustrated as a continuously operating rotary drum furnace; the material to be roasted is admitted at the upper end 35, whereas at the lower end the rotary drum is heated by gas burners 36. The calcined mass falls into a container 37. The air necessary for roasting is introduced through a tubulure 38. The hot gases are drawn through a pipe 39 into a dust separator 40 and are discharged through a pipe 41 for further treatment, as described below. As the raw sulphur to be roasted in the rotary drum 34 advances from the cool to the more highly heated zones, the mass traverses also the mean temperature region in which the reaction between the cyanogen compounds and the iron oxyhydrate, with the presence of the steam arisen, forms ammonia from the Prussian blue. Since these ammonia vapours travel towards the cooler end of the rotary drum 34, they suffer no subsequent decomposition by higher temperatures. The ammonia produced is utilized in a further stage of the process described later.

The gases from the furnace are withdrawn through the pipe 41 while still relatively hot and contain, besides the sulphur dioxide, also in known manner about 2 to 6 per cent. of their content of sulphur as sulphur trioxide, and are then led to a washing vessel 42 wherein they are sprinkled by a rose 43 supplied with a limited quantity of fresh water, or, instead of the latter, with such one of the treating liquids which is free from sulphuretted hydrogen. In this way a dilute sulphuric acid solution is formed from the sulphur trioxide and collects at the bottom of the vessel 42. The further employment of this dilute sulphuric acid will be described later. The issuing furnace gases are led from 42 through a pipe 44 to the upper part 45 of a scrubbing tower which is sprinkled at the top by an apparatus 46 and is provided internally with an acid-resisting filling material. At the commencement of the operation, fresh water or ammonia liquid can be used as the liquid for sprinkling, in the later procedure a lye containing dissolved ammonium sulphate formed in the process. This lye, flowing downwards over the filling material in 45, causes the sulphur dioxide gas, entering the bottom of the tower 45 by the pipe 44, to form a solution of sulphurous acid and the ammonia carried with it to form ammonium sulphite. The gases treated are withdrawn through a pipe 47 at the top of the tower and contain then essentially only nitrogen, carbonic dioxide and a small rest of atmospheric oxygen.

The sulphurous acid lye passed through the tower 45 is collected above the base 48, flows then through a discharge pipe 49 and a seal pot 50 to a sprinkling apparatus 51 provided for showering the lower part 52 of the tower 45, which also is provided with an acid-resisting filling material. The gas containing ammonia, withdrawn from the scrubber 13, is led by a pipe 53 into the lower part of the tower 52. As the gas rises through the filling material 52 in counter-current to the sulphurous acid lye trickling from above, the ammonia contained in the gases is combined to form ammonium sulphite which passes into solution. Now, as a main feature of the invention, the operation of the washer 52 is carried out so that, by maintaining an adjusted quantity of the washing lye passing therethrough and a suitable concentration of sulphurous acid therein, the effect is secured that the lye discharged at the bottom of the washer is ammoniacal. This can readily be accomplished by the countercurrents of the liquid and of the gases, because the gas at this place has its full content of ammonia in the free form. The washing liquid collected at the base of the tower 52, and consisting substantially of a solution of ammonium sulphate, ammonium sulphite and free ammonia, is delivered by a pipe 54 and a rotary pump 55 to the bottom of an oxidizing tower 56, which, as the previously described oxidizing tower 17, contains the liquid also as a column of about 20 meters or more in height.

Fresh compressed air of relatively high pressure, preferably about 6-8 atm., or instead thereof an oxygen containing gas, is introduced into the bottom of this column of liquid by a distributing apparatus 57. The compressed air, after ascending through the column and arriving at the upper end of the tower 56, where there is a free air space 58, has here a pressure of still several atms. and is led away through a pipe 74 to the distributor 18 of the oxidizing tower 17 of the desulphurizing plant. Wherein it utilizes its remaining content of oxygen and also its pressure. By the action of the compressed air introduced through the distributor 57 on the lye present in the oxidizing tower 56, the content of the lye in ammonium sulphite is oxidized to sulphate. This oxidizing action is, on the one hand, assisted by the content of free ammonia of the lye and, on the other hand, by the high pressure of the air. The high column of liquid raises the value of the air pressure that can be employed and therewith the effective concentration of the oxygen. The ammoniacal condition of the lye causes all the iron dissolved a certain amount of which is at least, even without special introduction, always present in the liquid due to the use of the iron apparatus, to take in the oxidized stage the form of hydroxide of iron. The presence of these small quantities of iron hydroxide accelerates the oxidation process. The alkalinity of the liquid also lessens any corrosive action in all the apparatus through which it passes in this condition, consequently on the whole path from the bottom of the tower 52 to the upper part of the tower 45. Also this alkalinity, as will be shown, ensures the neutral state during the later evaporation in which an acid content would be very detrimental.

The oxidized ammonia salt lye from the tower 56 is discharged through an outlet 60, which, in order to be shielded from the ascending air jet, is only open above, and through a connecting pipe 61, in which a throttle valve 59 for reducing the pressure is inserted, to a tubular cooling device 62 in order to reduce any excess temperature resulting from the heat of the reaction, and then to the sprinkling apparatus 46 at the upper end of the tower 45. As shown, the washing liquor follows a constant cyclic path through the scrubbers 45 and 52 and the oxidizing tower 56. In the latter it gradually enriches its concentration of dissolved ammonia salt, that is, finally, of ammonium sulphate. From this enriched ammonia salt lye, a portion is taken from time to time through a discharge pipe 64, provided with a closing valve 63, and led to an evaporating apparatus which is shown here as fired pan 65, in order to give, as the final product, crystallized ammonium sulphate. Since the lye drawn off, as explained above, contains free ammonia, in order to neutralize this ammonia, a sufficient quantity of the sulphuric acid solution formed in the vessel 42 is removed through a pipe 66 and introduced into the aforesaid pipe 64. The rest of the sulphuric acid solution from the vessel 42 is led through a pipe 67 to the seal pot 50 and ultimately to the scrubbing tower 52.

The gas, treated in the tower 52 and there freed from the main part of its content of ammonia, is led from the upper part of the tower 52 through a pipe 68 to the lower end of a final scrubbing tower 69 where it is sprinkled from above with fresh water by the apparatus 70. The finally treated gas is withdrawn at the upper end of the tower 69 through a pipe 71. This final washing of the gas with water is intended to obtain, in the form of ammonia liquor, the last traces of ammonia remaining in the gas. The ammonia liquor collecting at the bottom of the tower 69 is led through a pipe 72 to the bottom of the tower 52 and in this way is introduced into the cyclic path of the ammonia salt lye used in this tower. Finally, therefore also this last residue of ammonia is obtained as ammonium sulphate. The quantity of liquid added in the form of ammonia liquor to the cyclic path of the ammonia salt lye serves also to compensate the quantity of liquid withdrawn from the cyclic path through the pipe 64 for evaporation.

In the described method of carrying out the process the sulphur content of the raw gases has been utilized exclusively as the source and starting material for the sulphuric acid required for the combination of the ammonia of the gases to the form of ammonium sulphate. If the sulphur content of the raw gases is too small for this purpose, additional sulphur of other origin, such as pyrites, zinc blende or other sulphur ores, can be converted in the roasting furnace 34. However, the described process of obtaining ammonium sulphate is in no way limited to the utiltization and conversion of the own sulphur present in the gases. It is only required that at the point where this proper treatment of the gases for obtaining the ammonia starts, the sulphuretted hydrogen is removed as far as possible from the gases. In the treatment of gases which are originally practically free from sulphuretted hydrogen, only essentially sulphur from another source would be introduced into the roasting operation.

Instead of gases already naturally containing ammonia, such, for example, as the gases obtained in the dry distillation of fuel, other gases and vapours laden with ammonia, for example, vapours distilled from ammonia liquor, can be treated according to the process described for obtaining ammonium sulphate. In the case of these distillation vapours care must be taken that an eventual content of sulphuretted hydrogen is removed before they are washed with the sulphurous acid lye. This can be done, for example, by suitably carrying out the distillation of the ammonia liquor, or by a separate treatment of the distillation vapours with means for combining the sulphur.

What I claim is:—

1. A process for obtaining ammonia as ammonium sulphate from ammoniacal gases free, or freed, from sulphuretted hydrogen which consists in the following steps:—passing an ammonium sulphate lye in a cyclic path through a first washer in contact with sulphurous acid gases, then through a second washer in contact with the ammoniacal gases to be treated for removing their ammonia and finally through an apparatus serving for the oxidation of the lye which oxidation stage constitutes a separate step in the said cyclic path, the washing in the second-mentioned washer being effected by a countercurrent in such a manner that the said lye on discharge from this washing is in an ammoniacal condition.

2. A process according to claim 1, in which the oxidation of the lye is effected by introducing air or oxygen containing gases into a column of the washing lye from below.

3. A process according to claim 1, in which the oxidation of the lye is effected by introducing air or oxygen containing gases into a relatively high and narrow column of the washing lye from below.

4. A process according to claim 1, in which the oxidation of the washing lye is effected by air of a pressure greater than atmospheric.

5. A process according to claim 1, in which the gases to be treated on discharge from the ammonia washing are maintained in an ammoniacal condition and are subsequently washed with fresh water, after which the ammonia liquor, formed thereby, is introduced into the cyclic path of the washing lye.

6. A process according to claim 1, in which the oxidation of the lye is effected by introducing compressed air into a relatively high and narrow column of the washing lye from below and in which the gases on discharge from the ammonia washing are maintained in an ammoniacal condition and are subsequently washed with fresh water, after which the ammonia liquor, formed thereby, is introduced into the cyclic path of the washing lye.

7. A process according to claim 1, in which as a preceding step sulphuretted hydrogen and cyanogen are removed from the gases by washing them with an aqueous suspension of iron oxide compounds and the suspension is oxidized by the introduction of air into a column of the same so that raw sulphur is separated out as a frothy mass floating on the surface of the column, this raw sulphur being thereafter roasted to sulphurous acid gases which are introduced into the cyclic path of the washing lye.

8. A process according to claim 1, in which as a preceding step sulphuretted hydrogen and cyanogen are removed from the gases by washing them with an aqueous suspension of iron oxide compounds and the suspension is oxidized by the introduction of air into a column of the same so that raw sulphur is separated out as a frothy mass floating on the surface of the column, this raw sulphur being thereafter roasted to sulphurous acid gases which are introduced into the cyclic path of the washing lye, this lye being oxidized as a separate step, by the introduction of compressed air into a relatively high column of the lye from below.

9. A process according to claim 1, in which as a preceding step sulphuretted hydrogen and cyanogen are removed from the gases by washing them with an aqueous suspension of iron oxide compounds and the suspension is oxidized by the introduction of air into a column of the same so that raw sulphur is separated out as a frothy mass floating on the surface of the column, this raw sulphur being thereafter roasted to sulphurous acid gases which are introduced into the cyclic path of the washing lye, this lye being oxidized, as a separate step, by the introduction of compressed air into a relatively high column of the lye from below and the remaining air after leaving the said column being used, still at a pressure greater than atmospheric, for oxidizing the said suspension.

10. A process according to claim 1, in which as a preceding step sulphuretted hydrogen and cyanogen are removed from the gases by washing them with an aqueous suspension of iron oxide compounds and the suspension is oxidized by the introduction of air into a relatively high column of the same so that raw sulphur containing Prussian blue is separated out as a frothy mass floating on the surface of the column, this raw sulphur being thereafter roasted in the presence of water vapour in a continuously operating furnace, in which the temperature increases gradually from one end to the other, and the roasting gases formed being conducted towards the zones of lower temperature and thereafter introduced into the cyclic path of the washing lye to be contacted therewith.

11. A process according to claim 1, in which as a preceding step sulphuretted hydrogen and cyanogen are removed from the gases by washing them with an aqueous suspension of iron oxide compounds and the suspension is oxidized by the introduction of air into a column of the same so that raw sulphur is separated out as a frothy mass floating on the surface of the column, this raw sulphur being thereafter roasted to sulphurous acid gases which are introduced into the cyclic path of the washing lye, and the content in sulphur trioxide of the gases formed by the roasting operation being fixed by washing the gases, while still hot, with an aqueous liquor, to a dilute sulphuric acid solution, which is used to neutralize the ammonium sulphate lye to be conveyed to an evaporating apparatus.

12. In a process according to claim 1, the preceding step that sulphuretted hydrogen and cyanogen are removed from the gases by washing them with an aqueous suspension of iron oxide compounds and the suspension is oxidized by the introduction of air into a column of the same so that raw sulphur is separated out as a frothy mass floating on the surface of the column, this raw sulphur being thereafter roasted to sulphurous acid gases which are introduced into the cyclic path of the washing lye, in combination with the step that the oxidation of the said washing lye is effected by compressed air of such an initial pressure that its diminished pressure remaining after the oxidation suffices for utilizing the waste air as oxidizing medium for the aforesaid aqueous suspension.

In testimony whereof I affix my signature.

FRIEDR. SOMMER.